United States Patent

Goto

[11] Patent Number: 4,728,791
[45] Date of Patent: Mar. 1, 1988

[54] RADIATION IMAGE READ-OUT METHOD
[75] Inventor: Chiaki Goto, Kanagawa, Japan
[73] Assignee: Fuji Photo Film Co., Ltd., Kanagawa, Japan
[21] Appl. No.: 782,812
[22] Filed: Oct. 2, 1985
[30] Foreign Application Priority Data
  Oct. 4, 1984 [JP] Japan .................. 59-208831
[51] Int. Cl.[4] .................. G03C 5/16
[52] U.S. Cl. .................. 250/327.2; 364/414
[58] Field of Search .................. 250/327.2, 484.1; 358/284; 364/414
[56] References Cited
  U.S. PATENT DOCUMENTS
  4,551,626 11/1985 Agano .................. 250/327.2
  4,571,635 2/1986 Mahmoodi et al. .................. 358/284

Primary Examiner—Janice A. Howell
Assistant Examiner—Richard Hanig
Attorney, Agent, or Firm—Sughrue, Mion, Zinn, Macpeak, and Seas

[57] ABSTRACT

In a radiation image read-out method for a radiation image recording and read-out system in which a stimulable phosphor sheet is used for storing radiation image information therein and the stimulable phosphor sheet is exposed to stimulating rays to emit light in proportion to the stored radiation energy and then the emitted light is detected and converted to electric image signals for displaying or reproducing a visible radiation image, there occurs a so-called flare phenomenon so that the stimulating light beam impinging upon the sheet is reflected by the surface of the sheet and the reflected stimulating light or scattering light is re-reflected by various parts of the read-out apparatus and impinges upon the sheet once more causing light emitted again therefrom. The noise caused by the flare phenomenon is eliminated by calculation, subtracting a part of the light emitted caused by the scattering light from the detected amount of light emitted from the sheet. The ratio of the amount of the scattering light to the amount of the stimulating light beam which impinges upon the sheet at the desired scanning point is obtained in advance by calculation or experiment, and the detected amount of light emitted from the sheet is corrected by use of the said ratio.

3 Claims, 3 Drawing Figures

RADIATION IMAGE READ-OUT METHOD

BACKGROUND OF THE INVENTION

1. Field of the Invention

This invention relates to a radiation image reproducing method for a radiation image recording and reproducing system in which a stimulable phosphor sheet is used for storing a radiation image information therein and the stimulable phosphor sheet is exposed to stimulating rays to emit light in proportion to the stored radiation energy and then the emitted light is detected and converted to electric image signals for displaying or reproducing a visible radiation image.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted into an electric image signal, which is processed as desired, to reproduce a visible image having improved quality, particularly high diagnostic efficiency and accuracy. The visible image which is finally obtained may be reproduced in the form of a hard copy or may be displayed on a cathode ray tube (CRT).

In such a radiation image recording and reproducing system, a read-out apparatus as shown in FIG. 2 is proposed to be used for scanning the stimulable phosphor sheet with stimulating rays as of a laser beam to have light emitted from the stimulable phosphor sheet and reading out the emitted light photoelectrically.

Referring to FIG. 2, a stimulating light beam 2 is emitted from a stimulating light source 1 and the diameter of the light beam 2 is rigidly controlled by means of a beam expander 3, and is deflected by a light deflector 4 such as a galvanometer mirror to scan a stimulable phosphor sheet 10 by way of a mirror 5. Between the light deflector 4 and the mirror 5 is provided an $f\theta$-lens 6 so that the light beam 2 may perform a main scanning in the direction of arrow C on the sheet 10 with a constant beam diameter at a constant speed. The sheet 10 is fed in the direction of arrow A to perform a sub-scanning, whereby the stimulating light beam scans the whole face of the sheet 10. By scanning the stimulating light beam 2 on the sheet 10, the sheet 10 emits light of such amount as to correspond to the stored radiation energy and the emitted light enters a light guide (light guiding sheet) 8 through the entrance face 8a thereof. The emitted light having entered the light guide 8 is transmitted to the exit face 8b by repeating total reflection and is received by a photodetector 9 such as a photomultiplier tube which is provided adjacent to the exit face 8b of the light guide. The light guide 8 and the photodetector 9 constitute a photoelectric read-out means 7.

The emitted light detected by the photodetector 9 is converted into an electric image signal and output from the photodetector 9, which signal is in turn amplified, A/D-converted, signal-processed and output as a visible image on a recording material such as a photosensitive material or a display device such as a CRT.

In the embodiment shown in FIG. 2, a reflector 14 is provided in front of the entrance face 8a of the light guide 8 with the scanning line located therebetween to reflect effectively the light emitted from the sheet 10 toward the entrance face 8a of the light guide 8 and increase the light collecting efficiency of the read-out system.

In the above-described read-out system, however, there occurs a so-called flare phenomenon so that, as shown in FIG. 3 when viewed from the direction of arrow B in FIG. 2, the stimulating light beam 2a impinging upon the sheet 10 is reflected by the surface of the sheet 10 and the reflected stimulating light (scattering light) 2b is reflected again by various parts of the read-out apparatus such as the reflector 14, the entrance face 8b of the light guide 8 and so forth and then impinge upon the sheet 10 again causing light emitted again therefrom. The extra light emitted again from the sheet 10 by this phenomenon is not the light from the point scanned originally by the stimulating light beam 2a, and accordingly, it will be a noise in the finally obtained radiation image and deteriorate the quality of the image lowering the contrast of the image.

SUMMARY OF THE INVENTION

The object of the present invention is to provide a radiation image read-out method in which the noise caused by the flare phenomenon is eliminated and an image of high quality can finally be obtained.

A more specific object of the present invention is to provide a radiation image read-out method in which a radiation image signal obtained by the read-out apparatus is corrected to eliminate the noise caused by the flare phenomenon thereby obtaining a radiation image signal of high accuracy.

The radiation image read-out method in accordance with the present invention is characterized in that the ratio of the amount of the scattering light which impinges upon the sheet at the undesired points to the amount of the stimulating light beam which impinges upon the sheet at the desired scanning point is obtained in advance by calculation or experiment, and the detected amount of the light emitted from the sheet upon exposure thereof to the stimulating light beam is corrected by use of the said ratio.

In more detail, said ratio is obtained in advance for every picture element for every scanning point or picture element. In other words, said ratio is obtained for all the picture elements around every picture element to be scanned. When a certain picture element is exposed to a stimulating light beam, the picture elements around the certain picture element are exposed to the scattering light caused by the light reflected by the sheet at said certain picture element, and the amount of the scattering light to which every picture element around it is exposed is always substantially the same, depending upon the predetermined pattern of the scattering light which depends upon the particular structure of various parts in the read-out apparatus. The ratio is thus obtained for every picture element around every scanning point. Then, when reading out a radiation image, the amount of the stimulating light beam impinging upon a certain scanning point (picture element) is multiplied by said ratio for every picture element around said certain scanning point to obtain the amount of the scattering light for every picture element around said certain point. Then, the ratio of the amount of the scattering light to the amount of the stimulating light which is used for scanning said respective picture elements is multiplied by the amount of the light emitted from the stimulable phosphor sheet at the respective picture elements to obtain the amount of the light emitted caused by the scattering light or the noise for every picture elements. Then, the amount of light thus obtained is subtracted from the amount of the light detected to obtain finally the amount of light emitted from the sheet based on the stimulating light beam and excluding the scattering light.

DETAILED DESCRIPTION OF THE INVENTION

Now the present invention will be described in detail with reference to the accompanying drawings.

Figure 1:
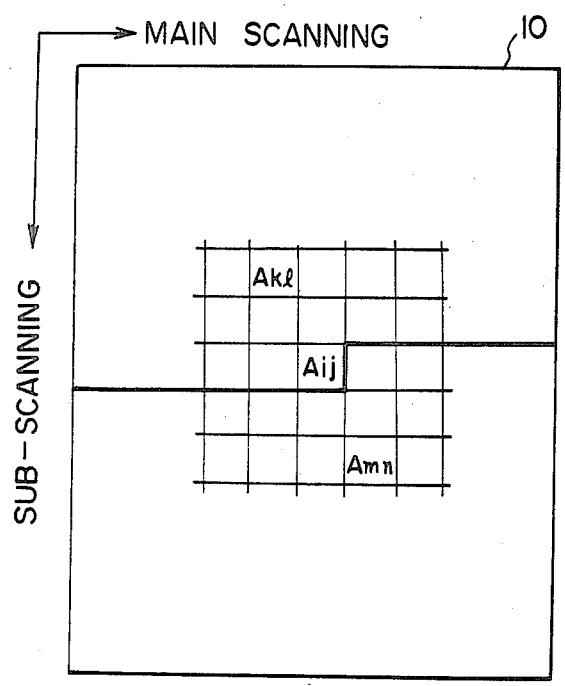
FIG. 1 is an explanatory diagram which shows the arrangement of the picture elements on a stimulable phosphor sheet that is scanned by a stimulating light beam and exposed to scattering light.
Figure 2:
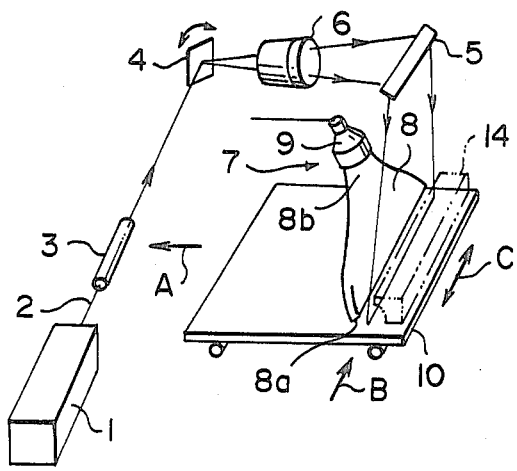
FIG. 2 is a schematic perspective view showing the structure of an example of a radiation image read-out apparatus to which the present invention is applied.
Figure 3:
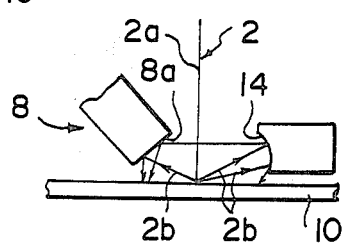
FIG. 3 is a partial side view of the apparatus shown in FIG. 2 viewed from the direction of arrow B.

FIG. 1 shows the arrangement of the picture elements on the stimulable phosphor sheet 10 and explains the method of the present invention. In accordance with the method of the present invention, first of all, the ratio $\gamma kl$ of the amount of scattering light $q'kl$ of the stimulating light beam which impinges upon a picture element Akl to the amount of stimulating light $Q'$ which impinges upon a desired picture element Aij (The first suffix i indicates the position in the sub-scanning direction and the second suffix j indicates the position in the main scanning direction of the picture element.) is obtained by calculation or experiment.

In a radiation image read-out apparatus, the scattering light has a fixed pattern depending upon the particular structure and arrangement of the optical elements thereof such as said reflector, light guide and so forth, and accordingly it can be found by experiment or calculation which picture elements around the picture element exposed to the stimulating light beam receive what amount of scattering light caused by the reflection by said optical elements of the apparatus of the stimulating light once reflected by the surface of the sheet.

Therefore, the amount of scattering light $q'kl$ which a picture element Akl will receive when a certain picture element Aij is exposed to the stimulating light beam of the amount $Q'$ is obtained in advance by experiments or calculation and the ratio $\gamma kl = q'kl/Q'$ is obtained in advance for every picture element.

Said ratio should be obtained for every picture element around the certain picture element to be exposed to the stimulating light beam in such an area over which the scattering light prevails and causes light emitted that can be received by the light guide. Further, the area in which said ratio should be obtained in advance may be determined in view of the degree of the light emitted from the sheet being caused by exposure to the scattering light. That is, the area may be limited to that covering only the picture elements, the light emitted from which upon exposure to the scattering light will affect the quality of the final image. For example, the ratio may be obtained for the picture elements within a square of $10 \times 10$ picture elements with the certain picture element Aij located at the center thereof.

The above-mentioned ratio may be obtained for all the picture elements on the sheet 10, but may be obtained for one scanning line only. This is because the ratio changes in the direction of the main scanning line, but generally does not change in the sub-scanning direction. Further, it may be understood that when the ratio does not change substantially even in the main scanning direction over some range, the ratio may not be obtained for all the picture elements in that range but may be represented by one or several ratios in that range.

After the ratios for the necessary picture elements have been obtained as mentioned above, the sheet 10 is scanned by a stimulating light beam and the light emitted from the sheet upon exposure to the stimulating light beam is detected by a photodetector to read out the radiation image.

Then, after the read-out, the amount of light emitted from every picture element due to the scattering light is subtracted from the amount of light emitted from said picture element detected by the photodetector, to obtain the amount of light emitted from said picture element based on the recorded image information. More precisely, the amount of light detected caused by the scattering light is subtracted from the amount of light actually detected for one picture element. Said detected light caused by the scattering light comes from various picture elements other than the read-out picture element the image signal of which is to be detected.

The amount of the light emitted from the sheet based on the scattering light is obtained as follows.

Firstly, the amount of light Qij of the stimulating light beam impinging upon a certain picture element Aij at the time of read-out is obtained. This amount of light Qij can be obtained from the read-out conditions (such as intensity of the stimulating light beam, the diameter of the stimulating light beam, scanning speed) which are determined in advance. Then, by multiplying the amount of light Qij by said ratio $\gamma kl$, the amount of the scattering light qkl ($qkl = \gamma kl \times Qij$) impinging upon the other picture element Akl at that time.

Then, the amount of light Qkl of the stimulating, light beam impinging upon said other picture element Akl when the other picture element Akl is actually read out. This amount Qkl can be obtained similarly to said amount of light Qij impinging upon said certain picture element. Normally, $Qij = Qkl$. The ratio of this amount Qkl to said amount qkl of the scattering light $\gamma''kl = qkl/Qkl$ is calculated, and by multiplying the amount of light emitted Skl obtained at the actual read-out of said other picture element Akl by said ratio $\gamma''kl$, the amount of emitted light based on the scattering light from the other picture element Akl at the time of reading out the certain picture element Aij, $skl = \gamma''kl \times Skl$ is then obtained.

In this case, since the amount of the stimulating light beam Qij impinging upon the certain picture element Aij is the same as the amount of the stimulating light beam Qkl impinging upon the other picture element Akl, said amount of emitted light skl can be obtained by multiplying said ratio γkl directly by said detected amount of emitted light Skl of the other picture element Akl. This can be represented by a formula as follows:

$$sk = \gamma''kl \times Skl$$
$$= \frac{qkl}{Qkl} \times Skl$$
$$= \frac{\gamma kl \times Qij}{Qkl} \times Skl$$
$$= \gamma kl \times Skl \;(\because Qij = Qkl)$$

Further, it will be understood that when the certain picture element Aij is read out, the scattering light will impinge not only upon the other picture element Akl but also upon a further different picture element Amn, and in addition, with respect to such a picture element Amn, the amount of the light $s_{mn}$ caused by the scattering light can be obtained in quite the same way to that as mentioned hereinabove.

However, in the illustrated example, when a certain picture element Aij is read out, one of said other picture elements Akl has already been read out and one of said further different picture elements Amn has not been read out yet. Therefore, said amount $s_{mn}$ for the picture element Amn can be obtained in said manner by use of said calculation, but the amount skl for the picture element Akl cannot be obtained in said manner but must be obtained by further multiplying a certain coefficient η (a constant determined based on the read-out coefficient) as follows:

$$skl = \eta \times \gamma''kl \times Skl$$
$$= \eta \times \gamma kl \times Skl$$

This is because the amount of light emitted from the stimulable phosphor sheet is reduced in the area which has been subjected to scanning by a stimulating light beam, and the rate of reduction is normally determined by the read-out efficiency. Therefore, the amount of light emitted from the sheet in the area having been subjected to the scanning as for the picture element Akl can be represented by multiplying the same by the coefficient η.

After the amount of light emitted for one certain picture element Aij, which also includes into it the light emitted due to said scattering light caused by the scattering light impinging upon various picture elements around said certain picture element Aij is summed up, it is subtracted from the amount of detected light Sij. The resultant of the subtraction is handled as the real amount of light emitted from the certain picture element excluding the noise and is designated as Sij*, which is represented as follows:

$$Sij^* = Sij - (\eta\Sigma\gamma kl\; Skl + \Sigma\gamma_{mn}\; Smn)$$

wherein when k<i l is all, when k=i l<j, when m>i l is all, and when m=i l>j. It will be understood that it is not necessary to take all the picture elements on the sheet into consideration as the above formula.

By applying the above process of subtraction to obtain the real light emitted from a certain picture element to all the picture elements, it is possible to obtain the real amount of light emitted from all the picture elements and eliminate the noise caused by the flare phenomenon.

It may be understood that the above-described method is based on the premises that the amount of light emitted from a picture element is in proportion to the amount of light impinging upon the picture element. In the case that the relationship between these two amounts is far remote from a direct proportion, a variable to correct the relationship may be further multiplied to the finally obtained amount Skl together with said ratio γ"kl. Further, said amount skl is obtained through a calculation of $skl = \gamma''kl \times Skl$. However, it may be noted that the amount Skl is the amount of emitted light actually read out at the picture element Akl and accordingly it contains the amount of light caused by the scattering light. Therefore, the amount Skl must be replaced by Skl* to obtain the real amount. However, if such a method should be adopted, the calculation must be repeated many times and it is practically impossible. Since the practical demand does not require such an accurate amount, the above-described method is practically sufficient.

I claim:

1. A radiation image read-out method comprising the steps of scanning a stimulable phosphor sheet having radiation image information stored therein with a stimulating light beam, and reading out the radiation image information by photoelectrically detecting the light emitted from the stimulable phosphor sheet upon exposure thereof to the stimulating light beam, wherein the improvement comprises obtaining in advance the ratio of the amount of said stimulating light beam impinging upon a certain picture element on said sheet to the amount of scattering light from said stimulating light which impinges upon respective other picture elements at the time of said scanning to read out information stored in said certain picture element, obtaining the amount of scattering light which impinges upon said respective other picture elements at the time of said scanning from said ratio and the amount of the stimulating light beam which impinges upon said certain picture element at the time of said scanning, to read out information stored in said certain picture element, obtaining the amount of light emitted from said other picture elements upon exposure to said scattering light based on the amount of light emitted from the respective other picture elements upon exposure of those picture elements at the time of scanning, to read out information stored in those picture elements, and the ratio of the amount of scattering light obtained by the previous step, and the amount of the stimulating light beam which impinges upon said respective other picture elements at the time of scanning to read out information stored in those other picture elements, and subtracting the amount of light emitted from said other picture elements, obtained in the previous step, from the amount of light emitted from the certain picture element upon exposure thereof to said stimulating light beam at the time of scanning to read out information stored in said certain picture element, the remainder after the subtraction being treated as a real amount of light emitted from said certain picture element upon exposure thereof to the stimulating light beam at the time of scanning to read out information stored in said certain picture element.

2. A radiation image read-out method as defined in claim 1 wherein said subtraction step is conducted by use of said amount of light emitted from said other picture elements which are located only within a predetermined range relative to said certain picture element.

3. A radiation image read-out method as defined in claim 1 wherein the amount of said stimulating light beam impinging upon said certain picture element and the amount of said stimulating light beam impinging upon said other picture elements are assumed to be equal to each other.

* * * * *